US008655506B2

(12) United States Patent
Gomez et al.

(10) Patent No.: US 8,655,506 B2
(45) Date of Patent: Feb. 18, 2014

(54) IMPLEMENTING CONTINUOUS DESCENT APPROACHES FOR MAXIMUM PREDICTABILITY IN AIRCRAFT

(75) Inventors: Ramon Gomez, Madrid (ES); Francisco A. Navarro, Madrid (ES); Bastian Figlar, Madrid (ES)

(73) Assignee: The Boeing Company, Chicago, IL (US)

( * ) Notice: Subject to any disclaimer, the term of this patent is extended or adjusted under 35 U.S.C. 154(b) by 486 days.

(21) Appl. No.: 12/526,099

(22) PCT Filed: Feb. 22, 2008

(86) PCT No.: PCT/US2008/054663
§ 371 (c)(1),
(2), (4) Date: Aug. 6, 2009

(87) PCT Pub. No.: WO2008/118581
PCT Pub. Date: Oct. 2, 2008

(65) Prior Publication Data
US 2010/0318244 A1    Dec. 16, 2010

(30) Foreign Application Priority Data
Feb. 23, 2007   (EP) .................................. 07380053

(51) Int. Cl.
*G01C 21/00* (2006.01)
(52) U.S. Cl.
CPC .................................. *G01C 21/00* (2013.01)
USPC ............................................................ 701/3

(58) Field of Classification Search
CPC ..... G01C 21/00; G05D 1/0217; G05D 1/0676; Y02T 50/80; Y02T 50/84
USPC ............................................. 701/3, 5, 16, 18
See application file for complete search history.

(56) References Cited

U.S. PATENT DOCUMENTS

| 4,792,906 | A | * | 12/1988 | King et al. | 701/5 |
| 4,825,374 | A | * | 4/1989 | King et al. | 701/5 |
| 5,225,829 | A | * | 7/1993 | Bateman | 340/967 |
| 7,611,098 | B2 | * | 11/2009 | Van Boven | 244/183 |
| 2006/0265110 | A1 | * | 11/2006 | Ferro et al. | 701/3 |
| 2008/0262665 | A1 | * | 10/2008 | Coulmeau et al. | 701/16 |
| 2010/0217461 | A1 | * | 8/2010 | Ledesma et al. | 701/18 |

FOREIGN PATENT DOCUMENTS

JP    2010195392  A  *  9/2010

OTHER PUBLICATIONS

Warren, A.; Kwok-on Tong; "Development of continuous descent approach concepts for noise abatement [ATC]," Digital Avionics Systems Conference, 2002. Proceedings. The 21st, vol. 1, No., pp. 1E3-1-1E3-4 vol. 1, Oct. 27-31, 2002, doi: 10.1109/DASC.2002. 1067906 (Warren publication).*
http://wright.nasa.gov/airplane/drageq.html (viewed on Jun. 5, 2012).*

(Continued)

*Primary Examiner* — John Q Nguyen
*Assistant Examiner* — Michael Whalen
(74) *Attorney, Agent, or Firm* — Moore & Van Allen PLLC (57) ABSTRACT

The present disclosure relates to methods of calculating and flying continuous descent approaches to an airport or the like, and to aircraft navigation systems for implementing these methods. The present disclosure resides in the recognition that greater predictability in arrival times may be achieved by flying continuous descent approaches by maintaining a constant aerodynamic flight path angle.

21 Claims, 4 Drawing Sheets (56) References Cited

OTHER PUBLICATIONS http://wright.nasa.gov/airplane/Idrat.html (viewed on Jun. 5, 2012).*
http://wright.nasa.gov/airplane/lifteq.html (viewed on Jun. 5, 2012).*
EIC Fast and Focused search dated Sep. 4, 2013.*
Van Boven, Machiel, "Development of Noise Abatement Approach Procedures", 10th AIAA/CEAS Aeroacoustics Conference, Manchester, UK, May 10-12, 2004.
Ren, Liling, et al., "Workstation Based Fast-Time Aircraft Simulator for Noise Abatement Approach Procedure Study", AIAA 4th Aviation Technology, Integration and Operations (ATIO) Forum, Chicago, Illinois, Sep. 20-22, 2004.
Weitz, Lesley A., et al, "An Analysis of Merging and Spacing Operations with Continuous Descent Approaches", The 24th Digital Avionics Systems Conference, Washington DC, Oct. 30-Nov. 3, 2005.
Clarke, John-Paul, et al., "Development, design, and flight test evaluation of the continuous descent approach procedure for nighttime operation at Louisville International Airport", Partnership for Air Transportation Noise and Emissions Reduction, Jan. 9, 2006.
Europeant Patent Office, PCT International Search Report, dated Sep. 10, 2008.

* cited by examiner

IMPLEMENTING CONTINUOUS DESCENT APPROACHES FOR MAXIMUM PREDICTABILITY IN AIRCRAFT

CROSS-REFERENCE TO RELATED APPLICATIONS

The present application is a National Stage application of International Application No.: PCT/US2008/054663 filed on Feb. 22, 2008, which claims the benefit of European Patent Application No.: 07380053.4 filed on Feb. 23, 2007, the contents of both of which are hereby incorporated by reference herein in their entireties.

FIELD OF THE DISCLOSURE

The present disclosure relates to methods of calculating and flying continuous descent approaches to an airport or the like, and to aircraft navigation systems for implementing these methods.

BACKGROUND

Typically, aircraft will approach an airport under the guidance of air traffic controllers. The air traffic controllers are tasked with ensuring the safe arrival of aircraft at their destination, while also ensuring the capacity of the airport is maximised. The former requirement is generally met by ensuring minimum specified separations are maintained between aircraft. Air traffic control is subject to uncertainties that may act to erode the separation between aircraft such as variable winds, both in speed and direction, and different piloting practices. Nonetheless, large numbers of aircraft can operate safely confined in a relatively small space since air traffic control can correct for these uncertainties at a tactical level using radar vectoring, velocity change and/or altitude change. As a result, a typical approach to an airport will involve a stepped approach where the aircraft is cleared to descend in steps to successively lower altitudes as other air traffic allows.

Air traffic noise around airports has important social, political and economical consequences for airport authorities, airlines and communities. An affordable way to tackle the noise problem in the vicinity of airports is to develop new navigation procedures that reduce the number of aircraft that fly over sensitive areas at low altitude with high thrust settings and/or with non-clean aerodynamic configurations (e.g. with landing gear and/or flaps deployed). Unfortunately, conventional step-down approaches act to exacerbate this problem as aircraft are held at low altitudes, where engine thrust must be sufficient to maintain level flight.

Continuous descent approaches (CDAs) are well known. These approaches see the aircraft approach an airport by descending continuously with the engines set to idle or close to idle. U.S. Pat. No. 4,825,374 describes a typical continuous descent approach implementation where an aircraft operates during the approach using a control law that maintains a constant airspeed by altering the attitude of the aircraft.

Clearly, continuous descent approaches are highly beneficial in terms of noise as they ensure that aircraft are kept as high as possible above sensitive areas while at the same time reducing the noise production at the source through optimum use of the engine and flaps. Continuous descent approaches also benefit fuel efficiency and minimise flight time.

However, continuous descent approaches must be planned in detail before commencing the approach and cannot be subjected to tactical corrections to ensure safe aircraft separation like those used in conventional step-down approaches. This obliges air traffic controllers to impose large separations between aircraft to guarantee that the aircraft arrive at the airport separated by a safe distance, bearing in mind the potential differences in aircraft separation as a result of wind changes and other uncertainties. Such an increase in separation results in an undesirable reduction in airport capacity.

The capacity penalty associated with continuous descent approaches prevents their widespread use in airports and, to date, continuous descent approaches have only been used at airports with low levels of air traffic or at busier airports during quiet times (e.g. at night). Thus, it is desirable to have continuous descent approach procedures that minimise uncertainties in the position and ground speed histories of the aircraft, and as a result, in the aircraft arrival times. This would allow air traffic controllers to reduce safely the separation between aircraft, thus satisfying the capacity needs of modern airports.

SUMMARY

Against this background and from a first aspect, the present disclosure resides in an aircraft navigation system arranged to calculate a part of an aircraft flight plan that effects a continuous descent approach with the aircraft's engines set substantially to idle, the aircraft navigation system being arranged to determine an aerodynamic flight path angle to be maintained while flying the descent part of the flight plan.

It has been found that by operating a flight control law during a continuous descent approach that maintains a specified aerodynamic flight path angle produces the lowest uncertainty in arrival time of aircraft flying that approach. The reduction in uncertainty is impressive over the currently favoured control law used when flying continuous descent approaches, namely to maintain a constant airspeed. Improvements are also seen over other control laws such as maintaining a constant rate of descent and even maintaining a constant geometric flight path angle.

The aircraft navigation system may be arranged to determine the aerodynamic flight path angle such that maintaining the angle while flying the descent part of the flight plan produces minimal variation in coefficient of lift. Put another way, an aerodynamic flight path angle is determined that shows only minimal variation between the top and bottom of descent of the continuous descent approach.

As the optimum aerodynamic flight path angle is likely to vary for any particular aircraft type, and may even vary for different models within that type, the aircraft navigation system is preferably arranged to calculate the aerodynamic flight path angle with reference to the type of the aircraft. Further parameters are also likely to be used when calculating the aerodynamic flight path angle. Optionally, the aircraft navigation system is arranged to calculate the aerodynamic flight path angle with reference to any of the weight of the aircraft (preferably a value corresponding to the weight at the top of descent), the expected wind and wind gradient and the expected atmospheric conditions. Preferably, the aircraft navigation system is arranged to receive a top of descent (TOD) altitude and a target ground speed at that point, and to calculate the aerodynamic flight path angle to be maintained during the descent from that point. The aircraft navigation system may receive just a top of descent altitude, but may also receive a top of descent position. This may be a co-ordinate, e.g. specifying longitude and latitude, or it may be a reference point on the ground such as a waypoint.

Optionally, the system is arranged to determine the aerodynamic flight path angle with reference to a table of data relating aerodynamic flight path angles to flight parameters. The flight parameters may comprise one or more of: a top of descent altitude, a target ground speed to be flown at the top of descent, aircraft type, aircraft weight, wind speed, wind gradient, atmospheric pressure and atmospheric temperature. Preferably, the table is produced by running simulations to determine the aerodynamic flight path angle. Optionally, the simulations are run using input values of one or more of: a top of descent altitude, a target ground speed to be flown at the top of descent, aircraft type, aircraft weight, wind speed, wind gradient, atmospheric pressure and atmospheric temperature.

The system may be further arranged to receive the location of the top of descent and to use this location as the start point for the descent part of the flight plan. Furthermore, the aircraft navigation system may be further arranged to receive the location of the bottom of descent and to end the descent part of the flight plan at this location.

From a second aspect, the present disclosure resides in an aircraft navigation system arranged to guide the aircraft along a continuous descent approach, the aircraft navigation system being arranged to guide the aircraft so as to maintain an aerodynamic flight path angle during the continuous descent approach.

This aspect relates to implementing a continuous descent approach flight plan that may be calculated in accordance with the first aspect of the disclosure. When flying the continuous descent approach, it is the aerodynamic flight path angle that is maintained as prevailing conditions (such as wind speed and direction) try to impose changes on the attitude of the aircraft.

This method should be contrasted to the currently favoured control law of maintaining a constant airspeed, i.e. by making adjustments to the attitude of the aircraft that may include allowing changes in aerodynamic flight path angle.

The aircraft navigation system may be operable to guide the aircraft in at least two different ways. The aircraft navigation system, for instance, may provide cues to the pilot such that when the pilot controls the aircraft in accordance with these cues, a constant aerodynamic flight path angle is flown. Alternatively, the aircraft navigation system may be part of an autopilot or may provide information to an autopilot such that the autopilot flies the continuous descent approach flight plan. In this sense, "guide" may mean provide the necessary instructions to the autopilot or it may mean the actual flying of the aircraft.

Optionally, the aircraft navigation system may be arranged to maintain the aerodynamic flight path angle that produces minimal variation in coefficient of lift.

Preferably, the system is arranged: to guide the aircraft to fly at a specified top of descent altitude at a specified ground speed; at a specified top of descent location, to prompt the aircraft's engines to be set substantially to idle and to guide the aircraft such that its trim is adjusted to adopt the aerodynamic flight path angle; and, during the continuous descent approach, to guide the aircraft to ensure that the aircraft maintains the aerodynamic flight path angle.

Optionally, the aircraft navigation system is arranged to guide the aircraft to ensure the aircraft levels off and maintains level flight when the aircraft reaches a specified bottom of descent (BOD) location. Preferably, the aircraft navigation system is arranged to prompt the engines to be kept at idle so that the aircraft decelerates to a further specified airspeed. Also, the aircraft navigation system may be arranged to guide the aircraft to maintain level flight until a glide-slope to the destination is intercepted. The engines are kept at idle or close to idle such that the aircraft slows down, for example to a speed suitable for intercepting the glideslope of the ILS. Flaps and landing gear may be deployed during this part of the approach. The aircraft maintains this level flight for a short distance to intercept a glide slope into its destination, e.g. using an ILS (instrument landing system).

Preferably, the aircraft levels off when above a specified location on the ground. The uncertainties in wind will mean that aircraft are likely to arrive at this position with a spread of altitudes. This spread is likely to be small and should be tolerable within the confines of air traffic control. Nonetheless, other schemes may be implemented such as levelling off at a specified altitude.

From a third aspect, the present disclosure resides in an aircraft management system for use in managing aircraft flying continuous descent approaches into an airport, wherein the system is arranged: to determine aircraft types expected to fly into the airport; to determine, for each aircraft type, an optimum coefficient of lift that provides maximum predictability in the time to fly the continuous descent approach; and to calculate a common ground speed to be flown by the aircraft at the top of descent of their continuous descent approaches, wherein the common ground speed is calculated using the optimum coefficients of lift determined for the aircraft types.

This system may be used in conjunction with any of the systems described above. Namely, the aircraft management system may be used to determine a ground speed to be followed at top of descent that is used to calculate an aerodynamic flight path angle using the aircraft navigation system of the first aspect. Then, in turn, the aerodynamic flight path angle so determined may be used by the aircraft navigation system according to the third aspect to fly the continuous descent approach.

There is some flexibility in where the above systems may be located. It is contemplated that the aircraft management system according to the third aspect of the present disclosure be located at the airport. It could, for example, be associated with an air traffic control facility of the airport. Hence, the airport is responsible for determining the common ground speed and for making this information available to incoming aircraft.

The aircraft navigation system according to the first aspect may be located at the airport, i.e. such that the airport calculates the aerodynamic flight path angle to be flown by each approaching aircraft. This information is then made available to incoming aircraft along with the common ground speed. Alternatively, the aircraft navigation system according to the first aspect may be located within an aircraft, i.e. the aircraft may be responsible for determining the aerodynamic flight path angle to be followed.

Clearly, it makes sense for the aircraft navigation system according to the second aspect that implements flying the continuous descent approach to be located within the aircraft.

Returning to preferred, but optional, features of the aircraft management system according to the third aspect of the present disclosure, the system may be arranged to calculate the common ground speed by determining a ground speed for each aircraft type using the optimum coefficient of lift for maximum predictability associated with each particular type, and calculating the common ground speed based on an average of the ground speeds determined for each aircraft type. The system may be arranged to calculate the common ground speed by calculating a weighted average of the ground speeds determined for each aircraft type based on the expected proportion of continuous descent approaches to be flown by that aircraft type. Hence, an increased weighting may be provided for the aircraft types that most frequently fly into any particular airport.

Optionally, the aircraft management system may be arranged to calculate the ground speed $V_G$ for each aircraft type according to $$V_G = V_{TAS} - V_{wind}$$

where $V_{wind}$ is the wind speed at top of descent, and $$V_{TAS} = \sqrt{\frac{2 \cdot W_{TOD}}{\rho_{TOD} \cdot S \cdot C_L(MP)}}$$

where $W_{TOD}$ is the aircraft type's typical weight at top of descent, $\rho_{TOD}$ is the air density at top of descent, S is the wing area of the aircraft type and $C_L(MP)$ is the optimum coefficient of lift for maximum predictability for the aircraft type.

Alternatively, the aircraft management system may be arranged to calculate the common ground speed by determining an average optimum coefficient of lift for maximum predictability from the optimum coefficients of lift calculated for the different aircraft types and by using this average optimum coefficient of lift for maximum predictability to determine the common ground speed.

Optionally, the system may be arranged to determine the optimum coefficient of lift for maximum predictability for each aircraft type by calculating the optimum coefficient of lift for maximum predictability $C_L(MP)$ from $$C_L(MP) = -\frac{A}{2} + \sqrt{\left(\frac{A}{2}\right)^2 + C_{L^*}^2} \quad \text{where}$$

$$A = \frac{M}{2C_{D2}} \frac{\partial(T/W)}{M} \quad \text{and}$$

M is speed (Mach number), T is thrust, W is aircraft weight, $C_{L^*}$ is the most efficient coefficient of lift for the aircraft type. $C_{L^*}$ may be calculated from $$C_{L^*} = \sqrt{\frac{C_{D0}}{C_{D2}}}$$

where $C_{D0}$ and $C_{D2}$ are the usual coefficients of the parabolic drag polar. The derivation of equivalent formulae for finer models of the aerodynamic polar is straightforward.

The present disclosure also extends to an aircraft including any of the above aircraft navigation systems.

From a fourth aspect, the present disclosure resides in a method of managing aircraft flying continuous descent approaches into an airport, the method comprising: determining aircraft types expected to fly into the airport; determining, for each aircraft type, an optimum coefficient of lift that provides maximum predictability in the time to fly the continuous descent approach; and calculating a common ground speed to be flown by the aircraft at the top of descent of their continuous descent approaches, wherein the common ground speed is calculated using the optimum coefficients of lift for maximum predictability determined for the aircraft types.

From a fifth aspect, the present disclosure resides in a method of calculating a part of the aircraft flight plan to effect a continuous descent approach with the aircraft's engines set to idle or near idle, comprising calculating an aerodynamic flight path angle to be maintained while flying the descent part of the flight plan.

From a sixth aspect, the present disclosure resides in a method of flying a continuous descent approach in an aircraft, comprising: ensuring that the aircraft adopts an aerodynamic flight path angle during the continuous descent approach.

Other optional features of the above methods are defined in the appended claims.

BRIEF DESCRIPTION OF THE DRAWINGS

In order that the present disclosure may be more readily understood, preferred embodiments will now be described, by way of example only, with reference to the accompanying drawings in which.

DETAILED DESCRIPTION

The present disclosure arises from a study performed to investigate how continuous descent approaches with different control laws affect predictability in flight times over those approaches. In particular, the work set out to establish which of the different possible control laws that may be used with continuous descent approaches provided the best predictability and whether this law could be optimised enough to allow continuous descent approaches to become a viable alternative to conventional step-down approaches currently in use at busy airports. The control laws considered are constant airspeed, constant rate of descent, constant geometric flight path angle and constant aerodynamic flight path angle. Further details of this study may be found in a paper entitled "Design of Continuous Descent Approaches for Maximum Predictability" by Ramón Gómez Ledesma, Francisco A. Navarro (both of Boeing Research & Technology Europe Madrid, Spain) and Bastian Figlar (of Technische Universitat Munchen, Germany). The conclusions from that study that are most relevant to its application to the present disclosure are now presented.

It is known that the largest influence in unpredictability in conventional continuous descent approaches that follow a constant airspeed arises from variation in wind speed and direction. As such, this makes the conventional control law of maintaining a constant airspeed clearly unsuitable and so allows a quick elimination of this control law from the consideration.

It is clear that the predictability in flight times is at its best when the magnitude of the aircraft's acceleration with respect to the ground is least sensitive to variations in wind speed and direction provided that all operations are started above the same ground location and with the same ground speed. Starting from this premise, a consequent condition was found for an optimum coefficient of lift that provides maximum predictability in idle descents, $C_L(MP)$. There is a unique value of $C_L(MP)$ for any particular aircraft type (or variant of an aircraft type). In general, $$C_L(MP) = \frac{A}{2} + \sqrt{\left(\frac{A}{2}\right)^2 + C_{L^*}^2} \qquad \text{eq. (1)}$$

where A is a variable and $C_{L^*}$ is the most efficient coefficient of lift for the particular aircraft under consideration. Assuming the drag polar to be quasi-steady, incompressible and parabolic such that coefficients $C_{D0}$ and $C_{D2}$ are defined in their usual manner, $C_{L^*}$ is given by $$C_{L^*} = \sqrt{\frac{C_{D0}}{C_{D2}}}. \qquad \text{eq. (2)}$$

This expression may be easily generalized for use with other models of the aircraft drag.

The variable A in equation (1) above depends upon the flight control law being considered. Using a constant aerodynamic flight path angle $\gamma_{TAS}$ would produce the following:

$$A = \frac{M}{2C_{D2}} \frac{\partial(T/W)}{\partial M}, \qquad \text{eq. (3)}$$

where M is Mach number, T is thrust and W is weight, all relating to the aircraft. The variable A remains very approximately constant throughout the execution of a given idle or near idle descent and, hence, the optimum coefficient of lift $C_L(MP)$ found for any particular aircraft remains constant during the descent. It has been found advantageous for continuous descent approaches to be flown according to control laws that, while not actively controlling the aircraft to maintain this coefficient $C_L(MP)$, nonetheless result in a coefficient of lift $C_L$ that remains close to this optimum value $C_L(MP)$. This fact eliminates continuous descent approaches that use a constant rate of descent as a promising candidate. This is because a constant rate of descent that intends to keep a constant lift coefficient would require an approximately constant true airspeed $V_{TAS}$ if thrust is set to idle, and this inevitably leads to progressive changes in the coefficient of lift which is contradictory.

This leaves only two candidates, namely maintaining a constant geometric flight path angle $\gamma$ and a constant aerodynamic flight path angle $\gamma_{TAS}$. While both approaches yield promising results, a constant aerodynamic flight path angle has been found better. This is because it allows faster $\gamma_{TAS}$ descents, beneficial in terms of overall flight time (a prime consideration of airlines) and in terms of the influence of variations in wind during the descent (that is to say, the relative effect of a set wind speed change is less the greater the airspeed of the aircraft).

Hence, it has been found that flying continuous descent approaches by controlling an aircraft to follow a preset aerodynamic flight path angle $\gamma_{TAS}$ produces the most consistent flight times. As a result, aircraft will remain more evenly spaced. Advantageously, this means that smaller separations may be used between airplanes.

Typically, the actual aerodynamic flight path angle $\gamma_{TAS}$ to be followed will depend upon many factors. One of these factors is the ground speed $V_G$ to be flown at the start of the continuous descent approach, i.e. at the top of descent. This ground speed $V_G^{TOD}$ will be calculated by the airport and provided to incoming aircraft, as will be described in greater detail below.

The optimum aerodynamic flight path angle $\gamma_{TAS}$ also varies (for any particular aircraft) according to other flight parameters such as wind, wind gradient, aircraft weight and atmospheric conditions such as temperature and pressure. As some of these variables will vary from one continuous descent approach to the next, an optimum angle $\gamma_{TAS}$ should be determined for each continuous descent approach. This may be calculated for any particular aircraft by the airport and then supplied to incoming aircraft, along with the ground speed to be flown at top of descent. Alternatively, the aircraft may calculate an optimum angle $\gamma_{TAS}$ based on the ground speed $V_G^{TOD}$ supplied. In either case, the optimum angle $\gamma_{TAS}$ may be determined automatically or may be determined manually (e.g. by a pilot consulting data tables). Functions may be provided that relate the aerodynamic flight path angle $\gamma_{TAS}$ to the flight parameters mentioned above. Alternatively, tables of aerodynamic flight path angles $\gamma_{TAS}$ may be provided allowing a look-up for a particular combination of aircraft type, aircraft weight, wind, wind gradient and atmospheric conditions. These functions or tables may be available for use by the aircraft's computers, pilots, airport computers or airport personnel.

As noted above, the optimum aerodynamic flight path angle $\gamma_{TAS}$ is a function of several flight parameters. Changes in the aerodynamic flight path angle $\gamma_{TAS}$, and hence the predictability of the flight time, are more susceptible to inaccuracies in some flight parameters than others. For example, it has been found that variations in wind gradient from that used to calculate the aerodynamic flight path angle $\gamma_{TAS}$ does not markedly alter the aerodynamic flight path angle followed and does not substantially change the flight time. Similarly, inaccuracies in the aircraft's weight do not have a large effect.

However, a more marked effect on the aerodynamic flight path angle $\gamma_{TAS}$ flown and variation in flight time is seen for inaccuracies that may be expected in an airplane flight control system implementing the specified control law, i.e. the airplane's flight control system will not be able to maintain the specified aerodynamic flight path angle $\gamma_{TAS}$ perfectly, and the inaccuracies encountered as the aircraft drifts from the specified angle leads to the greatest variation in flight time. Hence, achieving good control of the aircraft such that it tracks the specified aerodynamic flight path angle $\gamma_{TAS}$ as closely as possible is particularly important.

It has also been found that the predictability in flight time is not particularly sensitive to changes in $C_L(MP)$, so the nominal flight path (and $\gamma_{TAS}$) can be calculated as described earlier but for a slightly different target coefficient of lift $C_L$. This is convenient since it allows the airport to assign a single ground speed at top of descent to all aircraft making continuous descent approaches to an airport, irrespective of any particular aircraft's type. This will result in most aircraft flying with a coefficient of lift $C_L$ slightly away from their optimum coefficient of lift $C_L(MP)$. However, this small difference means that the aircraft will display broadly similar velocity histories and only a small spread in flight times. This should enhance further airport capacity even if each airplane type flies a different $\gamma_{TAS}$.

Figure 1:
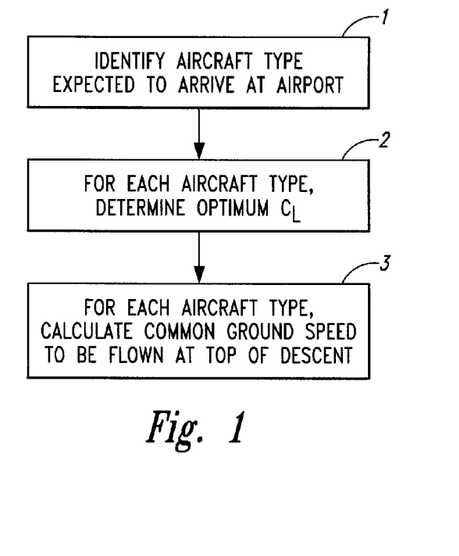
FIG. 1 is a schematic showing the steps taken to calculate a ground speed to be flown at the top of a continuous descent approach.

FIG. 1 and the following description is proposed as one way for airports to calculate a ground speed $V_G^{TOD}$ to be flown at top of descent. At 1, the airport identifies the aircraft types expected to fly into the airport. At 2, for any particular type of aircraft, the airport obtains the surface area S of the wing for that aircraft type, the typical weight $W_{TOD}$ of that aircraft type at top of descent and the optimum coefficient of lift $C_L(MP)$. At 3, the airport also determines the current air pressure and temperature at top of descent, thereby allowing the density $\rho_{TOD}$ of the air to be found. From this information, the airport can calculate a target airspeed $V_{TAS}^{TOD}$ for that aircraft type from:

$$V_{TAS}^{TOD} = \sqrt{\frac{2 \cdot W_{TOD}}{\rho_{TOD} \cdot S \cdot C_L(MP)}} \ . \qquad \text{eq. (4)}$$

This airspeed $V_{TAS}^{TOD}$ is readily converted to ground speed $V_G^{TOD}$ using the wind speed $V_{wind}^{TOD}$ at the top of descent, i.e. $V_G^{TOD} = V_{TAS}^{TOD} - V_{wind}^{TOD}$. $\qquad \text{eq. (5)}$ Hence, the ground speed $V_G^{TOD}$ for that aircraft type is found that provides the optimum coefficient of lift $C_L(MP)$. This process is repeated for all aircraft types known to use that airport. Different ground speeds may be found for different variants of an aircraft type (e.g. for the Boeing 777-200 and 777-300, or even 777-200, 777-200ER and 777-200LR). Hence, a series of ground speeds are found, comprising a ground speed $V_G^{TOD}$ for each particular aircraft type.

In theory, the ground speed $V_G^{TOD}$ could be supplied to each aircraft that is appropriate for its type. However, in practice, an average ground speed $V_G^{TOD}$ is found that is provided to all aircraft, irrespective of their type. This may be a straight average of the values found for each aircraft type (or variant). The average could be found using weighted contributions to reflect the numbers of any particular aircraft type using that airport. This may be useful as certain airports may have different distributions of aircraft type, e.g. hubs like London Heathrow see relatively more large aircraft like the Boeing 747 whereas regional airports tend to see predominantly smaller aircraft like the Boeing 737.

As mentioned above, knowing the ground speed to be flown at top of descent $V_G^{TOD}$ and the optimum coefficient of lift $C_L(MP)$ for any particular aircraft type allows the aerodynamic flight path angle $\gamma_{TAS}$ to be determined for that aircraft. This determination may be performed by the airport or by the aircraft. Also as mentioned above, the angle $\gamma_{TAS}$ may be found directly or tables of data may be derived that relate ground speed $V_G^{TOD}$ to the other flight parameters for an aircraft type. For example, it is possible to generate tables relating optimum aerodynamic flight path angle $\gamma_{TAS}$ to the flight parameters using simulations (either numerical or as flown in a flight simulator).

For example, simulations may be performed using a three degree of freedom model to calculate $\gamma_{TAS}$. In simulations, the wind conditions, the airplane weight and the starting altitude at TOD may be set to nominal (expected) values. The ground speed of the airplane at the top of descent $V_G^{TOD}$ may be entered to give the coefficient of lift at the top of descent $C_L^{TOD}$ (for example, calculated in accordance with equations (1) to (3). With these initial descent conditions fixed, an initial guess of the aerodynamic flight path angle $\gamma_{TAS}^0$ may be entered and a simulation of the continuous descent approach flown using a control law that followed this constant aerodynamic flight path angle $\gamma_{TAS}^0$. The value of $C_L$ at the bottom of descent (sometimes referred to as level of fix (LOF)) $C_L^{LOF}$ was compared to the coefficient at top of descent $C_L^{TOD}$.

As shown above, the most predictable descents occur when $\gamma_{TAS}$ is set so that the coefficient $C_L$ remains equal to $C_L(MP)$ and does not change over the descent for the nominal values of wind, wind gradient, weight and atmospheric conditions: hence, the simulations were repeated with the value of $\gamma_{TAS}$ iterated until $C_L^{TOD}=C_L^{LOF}$ (or the value of $\gamma_{TAS}$ that yielded the smallest difference in coefficients was found). Thus the optimum value of $\gamma_{TAS}$ is found for those particular flight parameters. It should be emphasized that the control law is based on maintaining $\gamma_{TAS}$ and not on maintaining $C_L$, and thus the values of $C_L$ will vary slightly from $C_L(MP)$ throughout the descent as the values of wind, wind gradient, weight and temperature or air pressure vary from the nominal expected conditions.

Each flight parameter may then be iterated and simulations repeated to find optimum values of $\gamma_{TAS}$. In this way, tables of data relating $\gamma_{TAS}$ to flight parameters may be derived. Then, in practice, these table may be referred to when a continuous descent approach is to be flown. For example, a pilot may collate the flight parameters (ground speed, wind speed, wind gradient, aircraft weight, temperature and pressure at top of descent) and use them to find the appropriate value and read off the optimum value of $\gamma_{TAS}$. As mentioned above, $\gamma_{TAS}$ may be determined by the airport. For example, they may be aware of an incoming Boeing 747-400 and so calculate an optimum $\gamma_{TAS}$ based on the current ground speed to be flown at top of descent $V_G^{TOD}$ (and using representative date for the aircraft type and current atmospheric conditions). The airport may then pass the ground speed $V_G^{TOD}$ and $\gamma_{TAS}$ to the aircraft.

Figure 2:
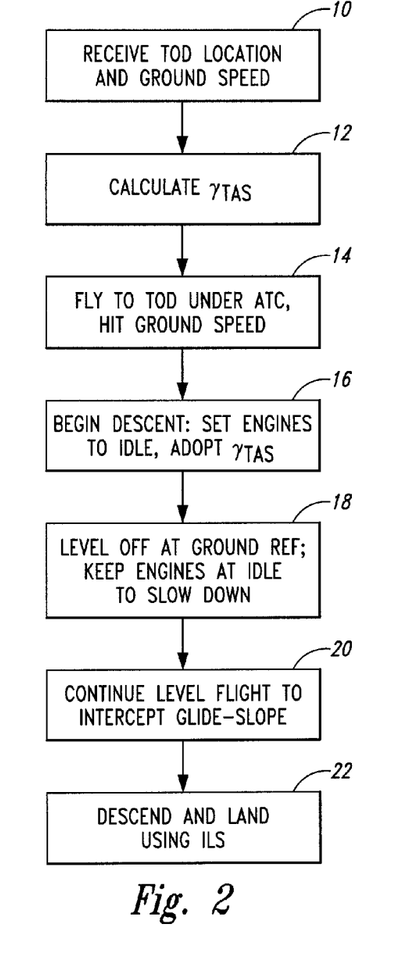
FIG. 2 is a schematic showing the steps taken in flying a continuous descent approach according to the present disclosure.

FIG. 2 shows schematically the steps that may be taken to fly a continuous descent approach according to the present disclosure, i.e. using a control law that maintains a constant aerodynamic flight path angle $\gamma_{TAS}$.

At 10, the aircraft receives a top of descent location from the destination, normally an air traffic controller associated with an airport. The top of descent location will specify a position and an altitude, e.g. 10,000 ft. Alternatively, this information may already be known to the pilot of the aircraft. For example, the pilot may be told on which runway to land such that the pilot may look up a top of descent location associated with that runway, for example from a flight bag.

In addition to receiving the top of descent location at 10, the aircraft also receives from the destination a ground speed to be followed at the top of descent $V_G^{TOD}$. As for the top of descent location, this information may be publicly available such that the pilot may retrieve this information from a flight bag or the like and so the step of sending the ground speed may be omitted.

In this embodiment, the ground speed specified $V_G^{TOD}$ is the same for all aircraft and so ensures similar velocity histories through the descents, thereby allowing separations to be kept to a minimum. The ground speed $V_G^{TOD}$ may be calculated as described above.

At 12, the aerodynamic flight path angle $\gamma_{TAS}$ to be followed is determined. In this embodiment, this step is performed at the aircraft rather than being performed at the airport. The determination may be performed by a computer of the aircraft or may be determined by the pilot. In this embodiment, the value of $\gamma_{TAS}$ is determined from a look-up table that relates $\gamma_{TAS}$ to aircraft weight, ground speed $V_G^{TOD}$, wind gradient and atmospheric conditions for that aircraft type. Aircraft weight (determined for the top of descent), average wind gradient and atmospheric conditions are typically available to the pilot. Preferably, however, the local wind gradient and atmospheric conditions are relayed to the aircraft at step 10, along with the ground speed.

At 14, the aircraft proceeds to the top of descent location, as prompted by air traffic control (ATC). This leg may be flown manually or using an autopilot. Either way, the aircraft is brought to the specified ground speed $V_G^{TOD}$.

Figure 3:
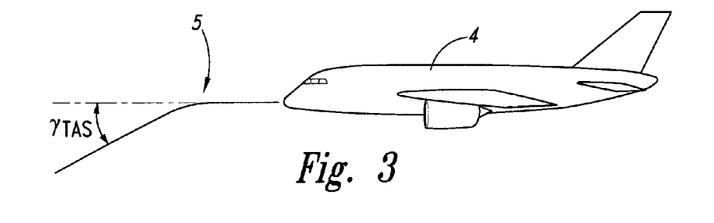
FIG. 3 is a side view of an airplane starting a continuous descent approach.

At 16, and as shown in FIG. 3, the top of descent location 5 is reached and the continuous descent approach started. The aircraft's engines are set to idle or near idle with the aircraft in a clean configuration. The aircraft 4 pitches down to adopt the calculated aerodynamic flight path angle $\gamma_{TAS}$. This segment is most likely to be flown under the control of the aircraft's autopilot that will use the aircraft's control surfaces to maintain the constant flight path angle $\gamma_{TAS}$ relative to the changing winds around the aircraft. The ability to control an aircraft using an autopilot is well known and will not be described further here. Alternatively, the segment may be flown manually although it is envisaged that the aircraft will provide cues to the pilot to enable the aerodynamic flight path angle $\gamma_{TAS}$ to be maintained.

The aircraft follows the continuous descent approach until, at 18, it reaches a reference point. Here, the aircraft levels off at whatever altitude it has reached. The intended altitude may be 2,000 ft, although different aircraft types and variations in the actual flight conditions through the first segment of the descent will mean that aircraft will arrive with a spread of altitudes around this desired value. The continuous descent approaches can be calculated to ensure that the spread in altitudes does not compromise safety.

The aircraft levels off at 18 with the engines still set to idle or near idle such that the aircraft slows down to meet the appropriate glide-slope speed for that aircraft. Flaps are deployed as soon as possible as the airspeed decreases to ensure that this segment is kept as short as possible.

Level flight is followed at 20 until the guide-slope is intercepted at 22. At this point the aircraft makes its final approach using ILS to land at its destination.

Figure 4:
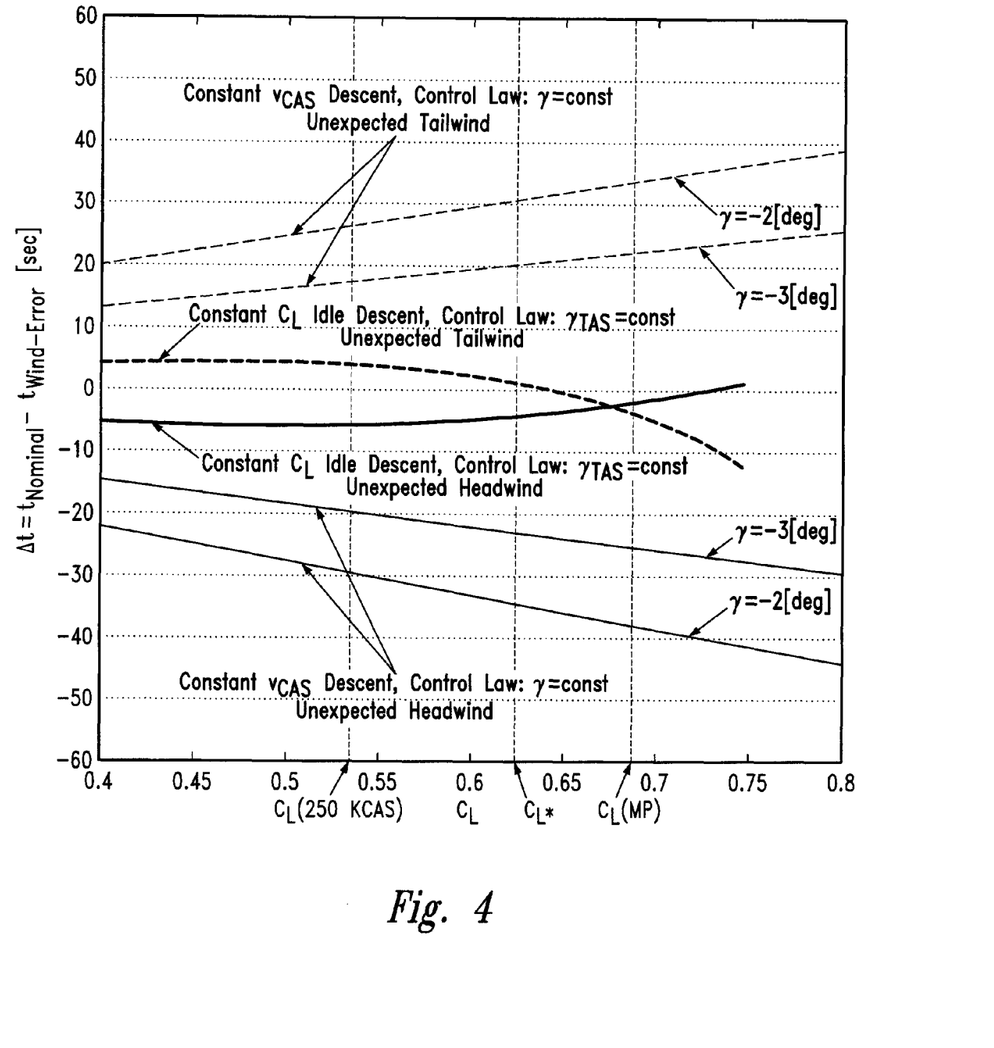
FIG. 4 is a graph showing variation in arrival times as a function of coefficient of lift ($C_L$) for both constant aerodynamic flight path angles ($\gamma_{TAS}$) and constant geometric flight path angles ($\gamma$), and for different wind conditions.

The predictability of the proposed continuous descent approach flight plans have been tested. FIG. 4 shows the results of one such test in terms of uncertainty of flight times for a continuous idle descent approach descending between 10000 ft and 2000 ft for a Boeing 737-300 aircraft. The uncertainty in flight times for constant aerodynamic flight path angle continuous descent approaches is compared to constant geometric flight path angle/constant calibrated air speed descents, for different wind conditions and different flight path angles. As can be seen, the uncertainty in flight time is much less for continuous descent approaches using a constant aerodynamic flight path angle, irrespective of the lift coefficient $C_L$ of the descent at nominal wind conditions.

Simulations were also performed to test performance of continuous descent approaches using differing control laws, in terms of reductions in noise impact, flight time and fuel consumption. The simulations were run for engine idle descents performed using a Boeing 737-300. The different control laws tested corresponded to those aimed at achieving lowest possible noise, shortest possible flight time, lowest possible fuel consumption and for maximum predictability (i.e. keeping the aerodynamic flight path angle $\gamma_{TAS}$ constant to ensure minimum variation in arrival time).

The continuous descent approach for reduced noise tries to follow the highest altitudes at the lowest possible speeds in two segments, starting at 10,000 ft. The calibrated airspeed is kept constant and equal to 210 $K_{CAS}$ during the first segment, which is just above the slowest recommended speed for this airplane flying in clean configuration. A geometric flight path angle $\gamma=-3.3$ deg was maintained, which ensures idle thrust with no wind present. In the second segment, the airplane is slowed by now following a revised geometric flight path angle $\gamma=-2.9$ deg and by deploying flaps at the nominal flap change speed. This segment is followed to intercept the glide slope from below, as recommended, and at 2,000 ft and 180 $K_{CAS}$.

The continuous descent approach for shortest possible flight time consists of a descent from 10,000 ft to 2,000 ft at 250 $K_{CAS}$ (the fastest allowed speed at those altitudes) and with geometric flight path angle $\gamma=-3.44$ deg, followed by a short level idle segment where the airplane deploys flaps and slows down to 180 $K_{CAS}$. In this approach, the flaps were deployed as soon as airspeed decreased to the maximum possible for that flap setting in order to shorten this segment and reduce even more the total flight time.

The continuous descent approach for minimum fuel consumption is executed at 232 $K_{CAS}$ which keeps the lift coefficient $C_L$ approximately equal to that of maximum efficiency between 10,000 and 2,000 ft, and geometric flight path angle $\gamma=-3.32$ deg. In this approach, there is also a short level idle segment after the descent where the airplane slows down to 180 $K_{CAS}$.

As an example, the continuous descent approach for maximum predictability was executed with an aerodynamic flight path angle $\gamma_{TAS}=-3.33$ deg, $C_L(MP)=0.687$, weight=110000 lb, TOD altitude=10000 ft, standard ISA atmospheric conditions and zero nominal wind for a Boeing 737-300 model with CFM56-3B1 engines. A level idle segment at 2,000 ft is also included to slow down the airplane to 180 $K_{CAS}$, right at glideslope interception. During this segment, flaps are deployed as early as possible to shorten this region, where the airplane does not fly at maximum predictability conditions.

Figure 5:
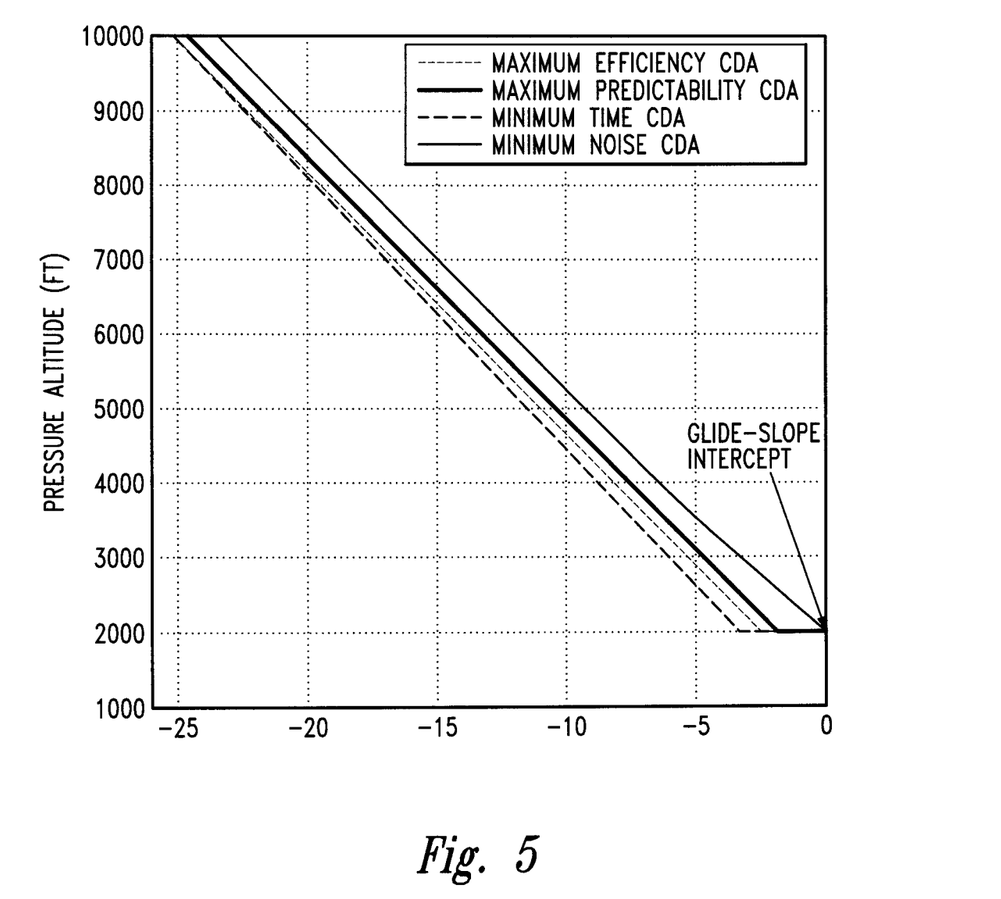
FIG. 5 is a graph showing altitude histories for four different continuous descent approach control laws.
Figure 6:
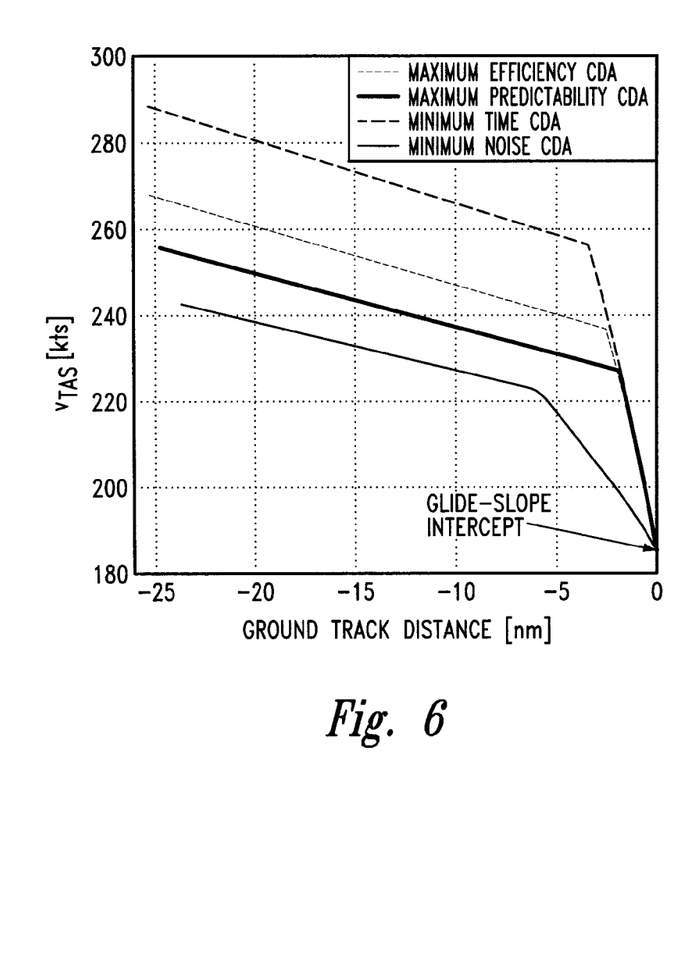
FIG. 6 is a graph showing airspeed histories for four different continuous descent approach control laws.

The altitude and velocity profiles of the different continuous descent approaches are shown in FIGS. 5 and 6. The simulations were used to calculate flight time and fuel consumption for these different continuous descent approaches. Also, an estimate of the single event noise impact associated with all four continuous descent approaches was calculated in terms of peak values ($LA_{max}$) and sound exposure levels (SEL) in dBAs.

Figure 7:
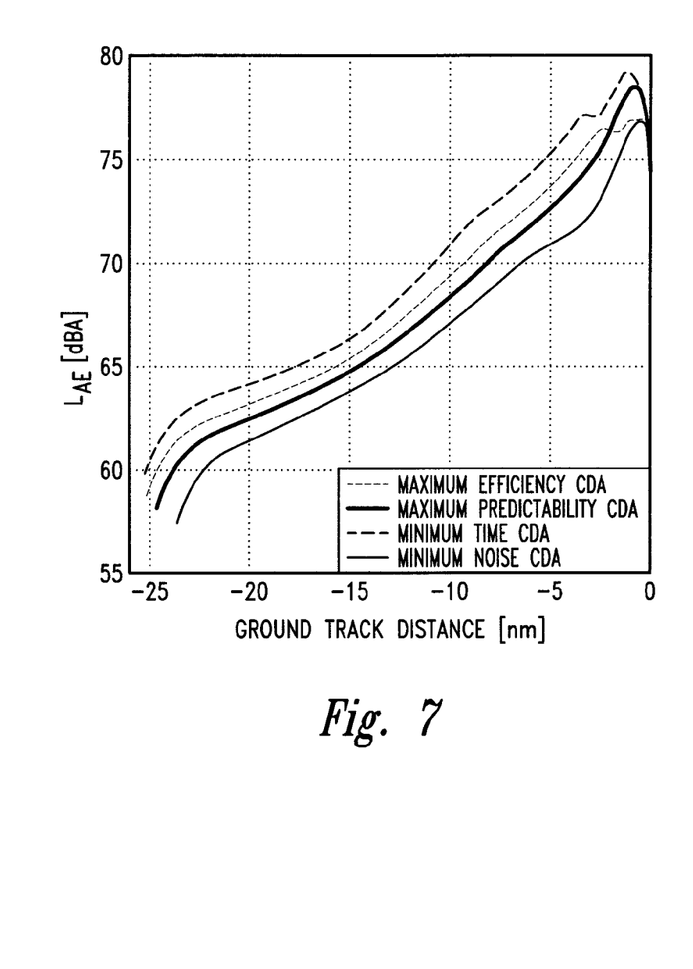
FIG. 7 is a graph showing sound exposure levels created during four different continuous descent approach control laws.

FIG. 7 shows the sound exposure levels at the ground track path for all four continuous descent approaches. The values of SEL and $LA_{max}$ along the ground track path for ground track distances equal to −5, −10, −15 and −20 NM were averaged and given in Table 1, together with the flight times and fuel consumptions for all four continuous descent approaches.

In addition, simulations were performed for the same conditions but with 15 knots of head wind, and the differences in flight time between the wind and no wind cases (Δt) are shown in table 1 as a measure of the degree of predictability of each continuous descent approach. The data shows that the performance of the continuous descent approach for maximum predictability remains close to the optimum in terms of noise reduction and fuel savings, and has only a small penalty in the flight time. The latter, that is associated with the interests of airlines, should be compensated by far by the benefits in predictability.

TABLE 1

| CDA Type | Time (s) | Fuel (lb) | SEL (dBA) | $LA_{max}$ (dBA) | Δt (s) |
|---|---|---|---|---|---|
| Time CDA | 362 | +6% | +5% | +8% | +627% |
| Fuel CDA | +7% | 143 | +3% | +5% | +713% |
| Noise CDA | +16% | +8% | 66 | 51 | +940% |
| Predic CDA | +10% | +1% | +2% | +3% | 3 |

It will be clear to the skilled person that variations may be made to the above embodiments without necessarily departing from the scope of the disclosure that is defined by the appended claims.

The invention claimed is:

1. A method of providing predictable flight time of an aircraft in a substantially idle continuous descent approach, comprising;
   determining an optimum coefficient of lift based on one or more parameters of the aircraft;
   determining a ground speed at a top of descent for the aircraft based on the optimum coefficient of lift;
   guiding the aircraft along an aerodynamic flight path angle ($\gamma_{TAS}$) based on the ground speed at the top of descent; and
   maintaining the aerodynamic flight path angle ($\gamma_{TAS}$) during the continuous descent approach.

2. The method of claim 1, comprising: guiding the aircraft to fly at a specified top of descent altitude at the determined ground speed; at a specified top of descent location, prompting the aircraft's engines to be set substantially to idle and guiding the aircraft such that its trim is adjusted to adopt the aerodynamic flight path angle; and, during the continuous descent approach, guiding the aircraft to ensure that the aircraft maintains the aerodynamic flight path angle.

3. The method of claim 2, comprising guiding the aircraft to ensure the aircraft levels off and maintains level flight when the aircraft reaches a specified bottom of descent altitude or specified bottom of descent location.

4. The method of claim 3, comprising prompting the engines to be kept at idle so that the aircraft decelerates to a specified airspeed.

5. The method of claim 3, comprising guiding the aircraft to maintain level flight until a glide-slope to the destination is intercepted.

6. A method of calculating a part of an aircraft flight plan that effects a continuous descent approach with the aircraft's engines set substantially to idle, the method comprising determining an aerodynamic flight path angle ($\gamma_{TAS}$) to be maintained while flying the descent part of the flight plan such that maintaining the angle while flying the descent part of the flight plan produces minimal variation in coefficient of lift, the aerodynamic flight path angle ($\gamma_{TAS}$) being determined based on a ground speed at a top of descent and the ground speed at the top of descent being determined based on an optimum coefficient of lift.

7. The method of claim 6, comprising running simulations to determine the aerodynamic flight path angle.

8. The method of claim 7, comprising running the simulations using inputted values of one or more of: a top of descent altitude, the ground speed to be flown at the top of descent, aircraft type, aircraft weight, wind speed, wind gradient, atmospheric pressure and atmospheric temperature.

9. The method of claim 8, comprising determining the aerodynamic flight path angle with reference to a table of data relating aerodynamic flight path angles to flight parameters.

10. The method of claim 9, wherein the flight parameters comprise one or more of: a top of descent altitude, the ground speed to be flown at the top of descent, aircraft type, aircraft weight, wind speed, wind gradient, atmospheric pressure and atmospheric temperature.

11. The method of claim 9, wherein the table is produced by running simulations to determine the aerodynamic flight path angle.

12. The method of claim 6, comprising receiving the location of the top of descent and using this location as the start point for the descent part of the flight plan.

13. The method of claim 12, comprising receiving the location of the bottom of descent and ending the descent part of the flight plan at this location.

14. A computer readable medium carrying a computer program that when executed on a computer, causes the computer to implement the method of claim 6.

15. A method of managing aircraft flying continuous descent approaches into an airport, the method comprising: determining aircraft types expected to fly into the airport; determining, for each aircraft type, an optimum coefficient of lift that provides maximum predictability in the time to fly the continuous descent approach and a resultant aerodynamic flight path angle ($\gamma_{TAS}$) to be maintained by the aircraft throughout the continuous descent approach; and calculating a common ground speed to be flown by the aircraft at the top of descent of their continuous descent approaches, wherein the common ground speed is calculated using the optimum coefficients of lift determined for the aircraft types.

16. The method of claim 15, wherein calculating the common ground speed comprises determining a ground speed for each aircraft type using the optimum coefficient of lift associated with each particular type, and calculating the common ground speed based on an average of the ground speeds determined for each aircraft type.

17. The method of claim 16, wherein calculating the common ground speed comprises calculating a weighted average of the ground speeds determined for each aircraft type based on the expected proportion of continuous descent approaches to be flown by that aircraft type.

18. The method of claim 15, wherein calculating the common ground speed comprises determining an average optimum coefficient of lift from the optimum coefficients of lift calculated for the different aircraft types and using this average optimum coefficient of lift to determine the common ground speed.

19. The method of claim 15, comprising passing the common ground speed to aircraft approaching the airport prior to them beginning their continuous descent approach.

20. An aircraft management system for use in managing aircraft flying continuous descent approaches into an airport, wherein the system is arranged: to determine aircraft types expected to fly into the airport; to determine, for each aircraft type, an optimum coefficient of lift that provides maximum predictability in the time to fly the continuous descent approach and a resultant aerodynamic flight path angle ($\gamma_{TAS}$) to be maintained by the aircraft throughout the continuous descent approach; and to calculate a common ground speed applicable to all aircraft types to be flown by the aircraft at the top of descent of their continuous descent approaches, wherein the common ground speed is calculated using the optimum coefficients of lift determined for the aircraft types.

21. An aircraft navigation system arranged to calculate a part of an aircraft flight plan that effects a continuous descent approach with the aircraft's engines set substantially to idle, the aircraft navigation system being arranged to determine an aerodynamic flight path angle ($\gamma_{TAS}$) to be maintained while flying the descent part of the flight plan such that maintaining the angle while flying the descent part of the flight plan produces minimal variation in coefficient of lift, the aerodynamic flight path angle ($\gamma_{TAS}$) being determined based on a ground speed at a top of descent and the ground speed at the top of descent being determined based on an optimum coefficient of lift.

* * * * *